US005098753A

United States Patent [19]

Gregory et al.

[11] Patent Number: 5,098,753

[45] Date of Patent: Mar. 24, 1992

[54] HEAT-SHRINKABLE ARTICLE

[75] Inventors: Nigel J. Gregory, Liskeard; Michael J. Stevens, Ivybridge; Peter I. Lee, Tavistock, all of England

[73] Assignee: Bowthorpe-Hellermann, Limited, Crawley, England

[21] Appl. No.: 529,941

[22] Filed: May 29, 1990

[30] Foreign Application Priority Data

Jun. 6, 1989 [GB] United Kingdom ................. 8912962

[51] Int. Cl.[5] ........................ H02G 15/64; B05D 7/22

[52] U.S. Cl. .............................. 428/34.9; 204/192.15; 174/DIG. 8; 174/36; 427/230; 428/642

[58] Field of Search ........................... 174/DIG. 8, 36; 428/34.9, 35.1, 642; 427/230; 204/192.14, 192.15

[56] References Cited

U.S. PATENT DOCUMENTS 4,766,267 8/1988 Gray et al. .................. 174/DIG. 8

*Primary Examiner*—James J. Seidleck
*Attorney, Agent, or Firm*—Rodman & Rodman

[57] ABSTRACT

A heat shrinkable tubular article e.g. for screening an electrical connector, is provided over a surface thereof with an electrically conductive continuous coating of substantially pure indium. Upon recovery of the article, the indium coating remains continuous and adhered to the surface of the article.

13 Claims, 1 Drawing Sheet

HEAT-SHRINKABLE ARTICLE

This invention relates to a heat-shrinkable tubular article having an electrically conductive coating over a surface thereof, the article being intended to enclose the junction between an electric cable and a connector and the conductive coating serving as an electrical shield.

It has been a problem with such articles to provide a lining which is of sufficient electrical conductivity for its shielding purpose, but which will maintain its integrity when the article shrinks or recovers. In particular, metal coatings of adequate thickness for the shielding function have broken up as the article recovers.

In accordance with this invention, there is provided a heat-shrinkable tubular article provided over a surface thereof with an electrically conductive continuous coating of substantially pure indium.

We have found that although indium has a distinct melting point (156° C.), it is quite ductile over a range of temperatures below that melting point. Moreover, even over a range of temperatures above its melting point, indium does not flow readily. Therefore the heat-shrink tubular article can be heated to a temperature of 145° C.–160° C. for recovery and, upon recovery, the indium coating deforms without cracking: after recovery the indium coating remains continuous and adhered to the surface of the article.

The metal coating may be sufficiently thick (e.g. 0.25 mm) to achieve high values of electrical conductivity, yet because at the recovery temperature it is soft and deformable, it does not significantly resist shrinking of the article.

The metal coating may be applied to the surface of the heat-shrinkable article by means of any appropriate technique in accordance with known principles. It can enhance the adherence of the metal coating to the article to apply a priming layer to its surface before the metal coating is applied, the priming layer being thin compared with the metal coating. One material which may used for the priming layer comprises a polymeric material, e.g. polyvinyl acetate, and this may for example be applied in the form of a water-based emulsion which is then dried to result in a polymeric layer of e.g. 30 microns thickness. As another example, a metal e.g. silver may be used for a priming layer. Such a metal priming layer may be applied for example by sputter-coating (vacuum deposition) typically to a thickness of 1 micron. One appropriate technique for applying the deformable metal coating comprises spraying.

Figure 1:
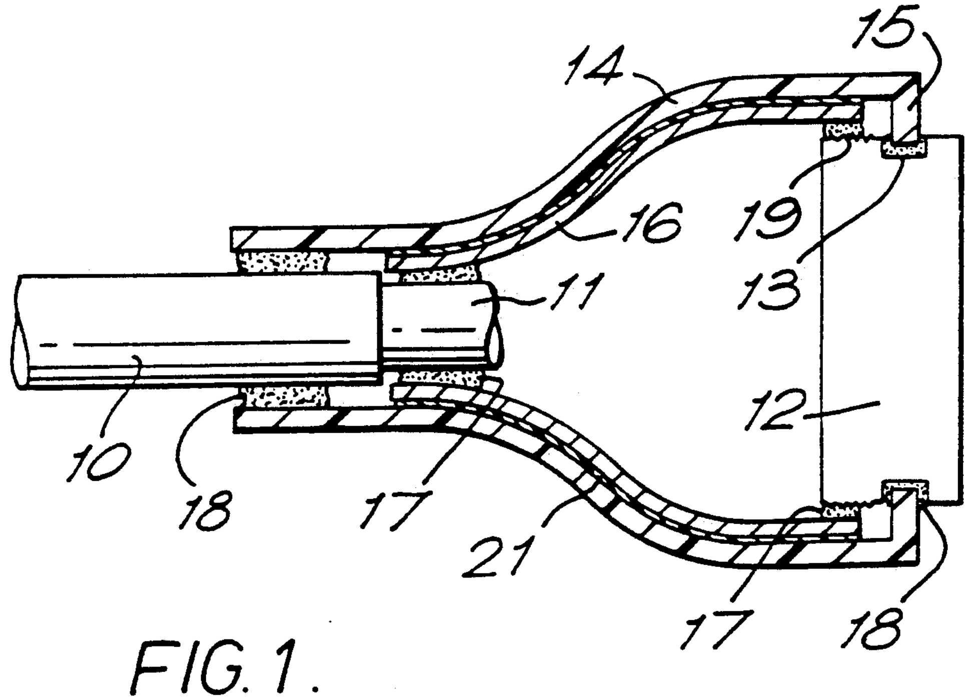
Figure 2:
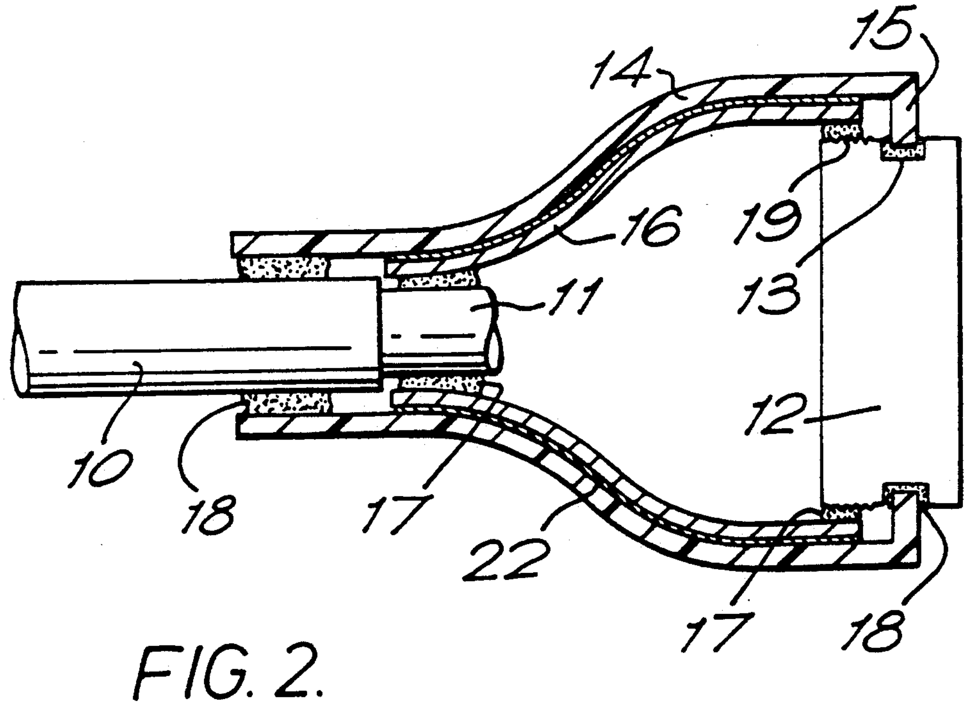

Embodiments of this invention will now be described by way of examples only and with reference to the accompanying drawings, in which:

FIG. 1 is a longitudinal section through a heat-shrinkable article or boot recovered about a cable and its connector; and FIG. 2 is a similar section through an alternative embodiment of boot recovered about a cable and its connector.

Referring to FIG. 1, a cable 10 is terminated by a connector component 12. The details of the connector component and of the termination of the cable conductors are not shown and do not form part of the invention. It is sufficient to note that the cable insulation is cut back a certain distance to expose a length of the screen 11 of the cable.

A heat-shrinkable boot 14 is shown recovered about the cable 10 and its connector component 12. The boot 14 is a tubular article of generally bottle-shape, with a narrower end recovered about the cable insulation and about a portion of the exposed cable screen 11, and a wider end recovered about the circumference or periphery of the connector component 12. In the example shown, the wider end of the boot is provided with an inturned rim or flange 15 which is received within a groove 13 formed around the periphery of the connector 12.

The boot 14 is provided with an electrically conductive lining 16 on its inner surface, extending from adjacent the wider end of the boot, over the larger-diameter section and the transition section and over just a portion of the smaller-diameter section. The lining 16 comprises a continuous coating of substantially pure indium which deforms without cracking upon recovery of the boot so that, after recovery, the coating remains continuous and adhered to the inner surface of the boot.

The indium coating 16 may have a thickness generally in the range of 0.2 to 2 mm, but preferably in the range 0.3 to 0.8 mm. Typically the boot 14 may have a wall thickness in the range of 0.5 to 2.5 mm and may for example have a length of the order of 5.5 cm, a diameter of 13 to 20 mm at its narrower end and a diameter of 35–45 mm at its wider end.

The material of the boot may be selected from a number of known plastics appropriate for forming heat-shrinkable articles and in the example shown in FIG. 1 comprises a cross-linked polyolefin. The boot is expanded in diameter, from its as-molded condition, by a factor preferably in the range 2 to 2.5, although the expansion factor can be up to 4.

The boot of FIG. 1 has a layer 21 of polymeric material disposed over its inner surface, the indium coating 16 being applied over this priming and the priming layer being thin compared with the indium coating 16. The priming layer 21 may have a thickness generally up to 50 microns.

In order to manufacture the article shown in FIG. 1, the boot 14 is molded and then undergoes expansion according to known techniques to render it capable of heat-recovery. Then in its expanded condition, the inner surface of the boot 14 receives its priming layer 21. In the example shown in FIG. 1 this comprises polyvinyl acetate and is applied in the form of a water-based emulsion for example by brushing, which is then dried to result in a polymeric layer of e.g. 30 microns thickness. Then the indium coating 16 is applied in one or more layers to the desired thickness using any appropriate technique in accordance with known principles. One appropriate technique comprises spraying using selective masking.

FIG. 2 shows a boot 14 which differs from the boot shown in FIG. 1, only in that a metal priming layer 22 replaces the polymeric priming layer 21 shown in FIG. 1. This priming layer preferably comprises a precious metal (for example silver or gold) which may be applied to the inner surface of the boot 14 by sputter-coating (vacuum deposition), typically to a thickness of 1 micron, before the indium coating is applied as described with reference to FIG. 1.

In use of the boot 14 of FIG. 1 or FIG. 2, the boot is positioned with its narrower end around the cable 10 and its wider end around the connector component 12. Just prior to applying the boot, the user may apply electrically conductive adhesive 17, for example a conductive epoxy adhesive, over a knurled part 19 of the connector and over the exposed screen 11 of the cable, and insulating adhesive 18, for example a hot melt or epoxy adhesive, over the groove 13 of the connector component 12 and over the cable sheath. Once the boot 14 is in position, heat is applied to it to cause it to shrink or recover for its narrower end to embrace the cable and its wider end to embrace the connector component 12 as shown in each of FIGS. 1 and 2. The temperature at which the boots 14 recover may be below or above the melting point (156° C.) of the indium. If the article is heated to 145° C.–156° C., the indium will not melt but it is sufficiently ductile to deform without cracking as the article recovers. If the article is heated to above 156° C., say to 160° C., the indium melts but does not flow away, so again it deforms as the article recovers. In either case the indium coating retains its integrity and remains as a continuous layer adhered to the inner surface of the boot 14.

The applied adhesive 17, serves to adhere the cable screen 11 and connector to the coating 16 in order to enhance the electrical contact between the cable screen and connector, respectively, and the coating 16. The adhesive 18, serves as a sealant between the cable insulation and connector, respectively, and the boot.

What is claimed is:

1. A heat-shrinkable tubular article provided with an inner surface having an electrically conductive continuous coating of indium having a melting point of 156° C., wherein said tubular article can be heated to a temperature of about 145°0 C. to 160° C. for recovery, and upon recovery, the indium coating deforms without cracking.

2. A heat-shrinkable tubular article as claimed in claim 1, in which a priming layer is disposed over said surface and said indium coating is disposed over said priming layer, said priming layer being thin compared with the indium coating.

3. A heat-shrinkable tubular article as claimed in claim 2, in which the priming layer comprises a polymeric material.

4. A heat-shrinkable tubular article as claimed in claim 3, in which said polymeric material comprises polyvinyl acetate.

5. A heat-shrinkable tubular article as claimed in claim 3, in which said polymeric material priming layer has a thickness up to 50 microns.

6. A heat-shrinkable tubular article as claimed in claim 2, in which the priming layer comprises a precious metal.

7. A heat-shrinkable tubular article as claimed in claim 6, in which the precious metal priming layer has a thickness of substantially 1 micron.

8. A heat-shrinkable tubular article as claimed in claim 1, in which said indium coating has a thickness in the range of 0.2 to 2 mm.

9. A heat-shrinkable tubular article as claimed in claim 8 in which said indium coating has a thickness in the range 0.3 to 0.8 mm.

10. A method of forming a heat-shrinkable tubular article provided with an inner surface, comprising taking an expanded heat-shrinkable tubular article and then applying indium having a melting point of 156° C. to the inner surface of said article to form an electrically conductive continuous coating therein, wherein said tubular article can be heated to a temperature of about 145°0 C. to 160° C. for recovery, and upon recovery, the indium coating deforms without cracking.

11. A method as claimed in claim 10, comprising the step of applying a priming layer to said surface of the article before the indium coating is applied

12. A method as claimed in claim 11, in which said priming layer comprises a polymeric material which is applied in the form of an emulsion and then dried.

13. A method as claimed in claim 11, in which said priming layer comprises a precious metal which is applied by sputter-coating.

* * * * *

UNITED STATES PATENT AND TRADEMARK OFFICE

CERTIFICATE OF CORRECTION

PATENT NO. : 5,098,753

DATED : March 24, 1992

INVENTOR(S) : Nigel J. Gregory et al

It is certified that error appears in the above-identified patent and that said Letters Patent is hereby corrected as shown below:

At column 3, line 33, change "145°0C" to -- 145°C --.

At column 4, line 27, change "therein" to -- thereon --.

line 28, change "145°0" to -- 145° --.

Signed and Sealed this

Thirteenth Day of July, 1993

Attest:

Michael K. Kirk

MICHAEL K. KIRK

*Attesting Officer*

*Acting Commissioner of Patents and Trademarks*